(12) United States Patent
Ruffa (10) Patent No.: US 8,073,797 B1
(45) Date of Patent: Dec. 6, 2011

(54) METHOD FOR SOLVING COMBINATORAL OPTIMIZATION PROBLEMS

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 737 days.

(21) Appl. No.: 12/287,157

(22) Filed: Sep. 29, 2008

(51) Int. Cl.
*G06F 17/00* (2006.01)
*G06N 5/00* (2006.01)

(52) U.S. Cl. .......................................... 706/45

(58) Field of Classification Search ............ 706/14, 706/45
See application file for complete search history.

(56) References Cited

OTHER PUBLICATIONS

Aras,N. et al. "A Kohonen-like Decomposition Method for the Traveling Salesman Problem—Knies Decompose". ECAI 2000. 14th European Conference on Artificial Intelligence. 2000. pp. 261-265.*

* cited by examiner

*Primary Examiner* — Jeffrey A Gaffin
*Assistant Examiner* — Benjamin Buss
(74) *Attorney, Agent, or Firm* — James M. Kasischke; Michael P. Stanley; Jean-Paul A. Nasser (57) ABSTRACT

A method for solving a combinatorial optimization problem and applying the solutions to routing as employed in naval convoying and other transit point scheduling. The method involves isolating a plurality of vertices into open-ended zones with lengthwise boundaries. In each zone, a minimum length Hamiltonian path is found for each combination of boundary vertices, leading to an approximation for the minimum-length Hamiltonian Cycle. The method discloses that when the boundaries create zones with boundary vertices confined to the adjacent zones, the sets of candidate HPs are found by advancing one zone at a time, considering only the vertices in the zone in question (with embedded HPs from previous zones) and an adjacent zone in the direction of progression. Determination of the optimal Hamiltonin paths for subsequent zones has the effect of filtering out non-optimal Hamiltonian paths from earlier zones.

14 Claims, 10 Drawing Sheets

METHOD FOR SOLVING COMBINATORAL OPTIMIZATION PROBLEMS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to a method for solving optimization problems, particularly minimal Hamiltonian cycle type problems, and a practical utilization of the solutions for these problems, including the application of the solutions to routing as employed in naval convoying or other transit point scheduling.

(2) Description of the Prior Art

It is known in the art that a "Traveling Salesman Problem" (TSP) involves finding a minimum length Hamiltonian Cycle (HC)—the path of visiting each vertex once and returning to the starting vertex. The minimum length HC resolves the routing problem of the TSP which can also be applied to naval convoying, trucks routes or even transit point scheduling such satellite positioning.

The symmetric TSP with N vertices has $(N-1)!/2$ permutations, precluding an exhaustive search except for small N. Even a relatively small problem (e.g., N=20) has $10^{16}$ distinct HCs; N=40 leads to $10^{46}$ distinct HCs. The Euclidean TSP is classified as an NP-hard problem, having no known algorithm for the general case whose number of operations is a polynomial function of N.

The $(N-1)!/2$ permutations assume that any vertex can occupy any of N positions. Isolating vertices into spatial zones locks each into a limited range of positions, subject to boundary vertex permutations. This falls into a general area of dynamic programming.

Partitioning the vertices into sub-problems has been done for the Euclidean TSP. In particular, a Polynomial Time Approximation Scheme (PTAS) generates a tour exceeding the optimal length by no more than a factor of $1+\epsilon$ in time $N^{O(1/\epsilon)}$. The approach involves a bounding square box dissected into squares and shifted randomly, with restrictions on edge crossings (to specified portals).

Most prior work on the TSP has focused on heuristics that generate tours. For example: a simple heuristic involves going to the nearest point. More complex heuristics include genetic algorithms, simulated annealing, and neural nets. In some cases, these approaches have found optimal tours. More likely, the approaches will come close (often to within two percent) of the optimal tour.

Another approach to the TSP makes use of a "DNA Computer". This approach involves DNA strands (with appropriate genetic coding to represent each point) mixed together in a test tube. A 7-point problem was solved by chemically eliminating all non-solutions. Although this process avoids exhausting every possible permutation creating during the chemical reactions, the process may take several days to find a solution.

Practical applications connected with the TSP go beyond traditional combinatorial problems involving scheduling and routing (e.g., planning of supply convoy routes to support naval bases). In physics, a three-dimensional Ising model used for studying phase transitions can be translated into a TSP problem. Scattering of X-rays from crystals can potentially involve accounting for as many as 30,000 different radiation paths. Other applications include VLSI chip fabrication, protein structure prediction, and the assignment of frequencies to transmitters in a communications network. Existing patent references disclose methods for solving the TSP:

In Marks et al. (U.S. Pat. No. 6,826,549), a system is provided that enables an interactively guided heuristic search for solving a combinatorial optimization problem. The system initially performs a hill-climbing search of the combinatorial optimization problem to obtain a solution using initial default parameters. The current solution and the combinatorial optimization problem are visualized on an optimization table, a table-top display device. The parameters are altered based on the visualization of the combinatorial optimization problem and the current solution. Then, the searching, visualizing, and setting are repeated until the solution is selected as an acceptable solution of the combinatorial optimization problem. During the repeating, the parameters can be a set of probabilities, and in which case the search is a random perturbation-based search. Alternatively, the parameters can be a set of priorities, in which case the search is an exhaustive local search.

In Okano (U.S. Pat. No. 6,510,384), a method is provided for increasing the execution speed of a cost-minimizing routing algorithm, as employed in trucking or job shop scheduling. Penalty functions for succeeding transit points along a route are added and examined for validity during trial route evaluation. A soft time window is set for each transit point and proposed routes are evaluated using a total cost including all soft time windows along the route and the length of the route. A static soft time window function and a dynamic soft time window function are correlated with each transit point. The dynamic soft time window function for each transit point is the sum of the static soft time window function for the transit point and the dynamic soft time window function for a succeeding transit point in the direction of travel.

In Goray et. Al. (U.S. Pat. No. 6,636,840), a computer system and associated method is configured to support solving NP-complete problems such as minimal Hamiltonian cycle type problems. A primary network represented by the matrix of its edges is recorded in the memory space and an equivalent representation of the primary network is formed as a set of subnetworks. Nodes of a present path are reordered according to a set of reordering rules and edge weights of edges of the set of subnetworks are changed according to a set of edge weight changing rules.

SUMMARY OF THE INVENTION

It is therefore a general purpose and primary object of the present invention to provide a method for solving a combinatorial optimization problem that can include the "Traveling Salesman Problem".

It is a further purpose of the present invention to provide a method for solving a combinatorial optimization problem of naval conveying or other transit point routing/scheduling.

The approach in the present invention dissects a set of vertices lengthwise. A line can dissect vertices contained in a plane, while a plane can dissect vertices disturbed in a three-dimensional space. The approach then finds optimal Hamiltonian Paths (HPs)—paths by visiting each vertex once—for the isolated zones independently of the other zones.

The number of combinations of boundary vertices (i.e., vertices that can extend edges from a zone to the adjacent zone) determines the number of optimal HPs for each zone. Sets of optimal HPs for each zone (with embedded HPs from previous zones) generate an HC for the set of vertices.

The present invention illustrates the procedure for a benchmark problem small enough to permit a detailed description of the entire solution process. For example: the ATT48 benchmark problem, known to those skilled in the art and to those who would try to resolve a combinatorial optimization problem.

The success of the approach depends on limiting the number of potential boundary vertices and crossing edges. In practice, sometimes as few as two edges will cross a boundary from one zone to another. The number of crossing edges can be increased to improve the solution. For example, if the optimal HC has four crossing edges between zones, the solution will improve by increasing the number of crossing edges from two to four.

In the present invention, the TSP problem is broken down into subproblems that depend on each other through boundary interactions. The boundaries separate zones and have a lengthwise nature. The boundaries form open-ended zones.

A single lengthwise boundary cuts the optimal HC into an even number of HPs, the sum of which must have the minimum length in each of the two created spatial zones. For example, if two HPs are created, the HP in each created zone (terminated at boundary vertices in the other zone) must have the minimum length. If an HP length exceeds the minimum, replacing the length with another HP (having the same vertices) will reduce the overall HC length. Stated another way, it is not possible to dissect the optimal HC into two HPs and replace one of them with a shorter HP having the same vertices. Each HP from the optimal HC will be the shortest length for that set of vertices.

The boundary vertices contained by the optimal HC associated with a particular dissection are not generally known; therefore, enumeration is required of all possible boundary vertices located in the adjacent zone. Typically, not all potential boundary vertices will connect edges to the adjacent zone. For example, as few as two edges (n=2) could connect two zones. For each value of n, the binomial coefficient $$\binom{b}{n}$$

provides the number of boundary vertex combinations ("b" is the number of potential boundary vertices). Summing over all values of n leads to $2^{b-1}-1$ combinations (when n=0 and odd values of n are eliminated). A minimum length HP is then found for each particular boundary vertex combination.

The second boundary isolates both zones 1 and 2 from the other vertices. The approach then finds the set of minimum length HPs for the combined vertices zones 1 and 2, except that the previously determined HPs from zone 1 become embedded in the new HPs.

Boundary vertices can comprise all the vertices in the adjacent zone, or (more likely) a smaller subset. Boundary vertices are usually those vertices closest to the boundary. Vertices close to the boundary often have the effect of eliminating other potential boundary vertices because the latter often lead to non-optimal HCs. Table 1 lists the zones and boundary vertices that will be depicted in FIG. 1 thru FIG. 10.

Figure 1:
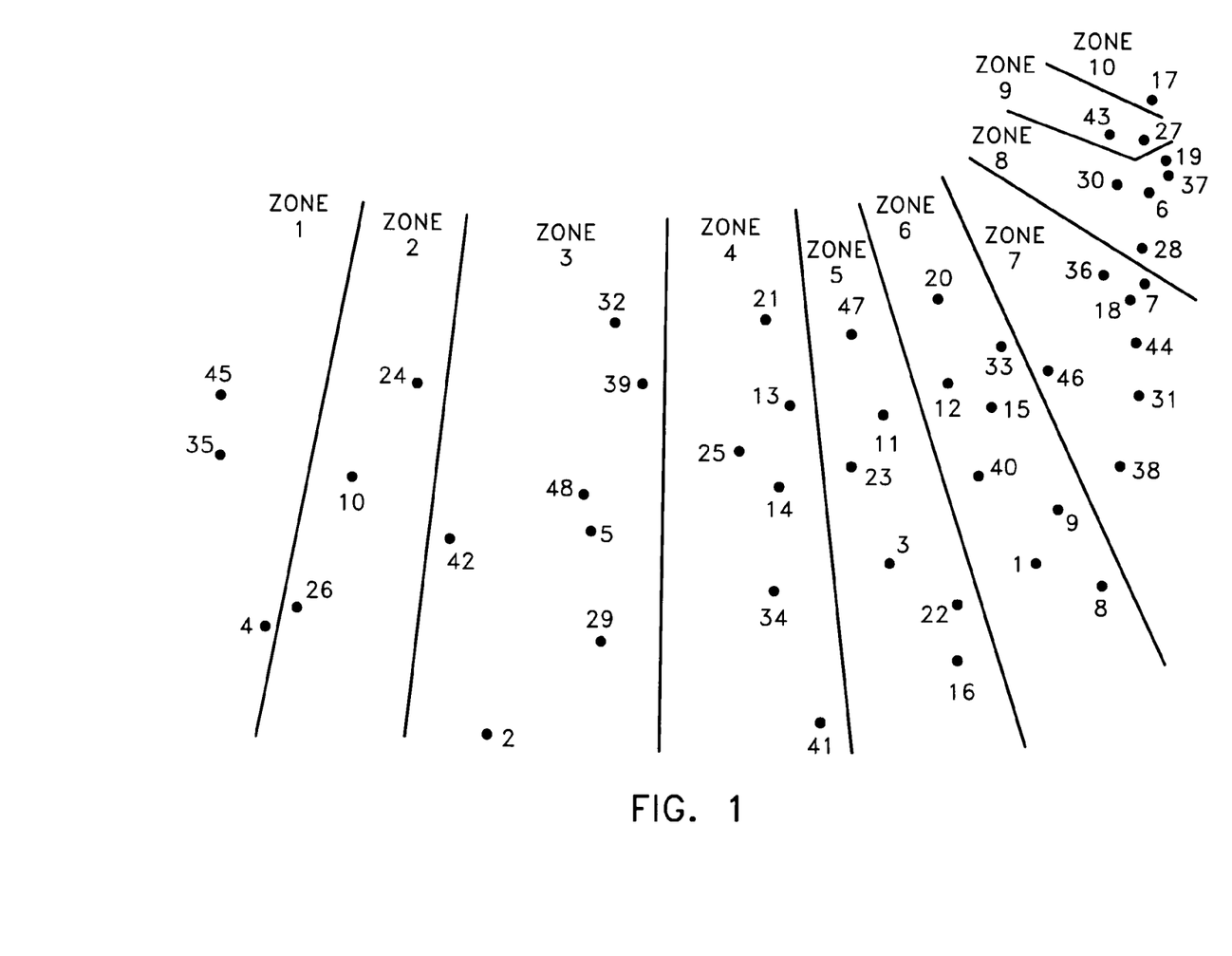
FIG. 1 depicts a separation of the vertices of a typical transit point in which the vertices listed in Table 1 are separated into the open-ended and numbered zones with nine lengthwise boundaries and ten zones with no Hamiltonian paths depicted.

Vertices 5, 33, 18, 7, 19, 37 are not boundary vertices as they are shielded by other vertices closer to the boundary, which is why they are not considered.

TABLE 1

Zones and Boundary Vertices

| Zone | Vertices | Boundary Vertices |
|---|---|---|
| 1 | 4, 35, 45 | 26, 10, 24 |
| 2 | 26, 10, 24 | 2, 29, 42, 48, 39, 32 |
| 3 | 2, 29, 42, 5, 48, 39, 32 | 41, 34, 14, 25, 13, 21 |
| 4 | 41, 34, 14, 25, 13, 21 | 16, 22, 3, 23, 11, 47 |
| 5 | 16, 22, 3, 23, 11, 47 | 8, 1, 9, 40, 15, 12, 20 |
| 6 | 8, 1, 9, 40, 15, 12, 33, 20 | 38, 31, 46, 44, 36 |
| 7 | 38, 31, 46, 44, 18, 7, 36 | 28, 6, 30 |
| 8 | 28, 6, 30, 37, 19 | 27, 43 |
| 9 | 27, 43 | 17 |
| 10 | 17 | — |

The set of minimum length HPs found for each zone (combined with all previously considered zones) includes embedded HPs from the previous zones. Embedded HPS are those in which the solution has already been determined. However, as the approach determines HPs for later zones, the approach filters out non-optimal embedded HPs from previous zones, until at the last zone, n=b=2, and no extraneous HPs remain.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical and corresponding parts throughout the views.

DETAILED DESCRIPTION OF THE INVENTION

The method of the present invention discloses that when the introduced boundaries create zones with boundary vertices confined to the adjacent zones, the sets of candidate HPs are found by advancing one zone at a time (whether on a two-dimensional plane or across a three-dimensional space), considering only the vertices in the zone in question (with embedded HPs from previous zones) and an adjacent zone "to the right" or in the direction of progression.

In FIG. 1, the vertices of a typical transit point scheduling separate ten zones by means of nine introduced boundaries, each dissecting as a lengthwise illustration. As shown in succeeding figures (FIG. 2 thru FIG. 10), each zone is connectable to adjacent zones via a limited number of edges. An edge is a straight line connecting two vertices.

The Zone 1 vertices (4, 35, and 45) can connect to two of the three boundary vertices in Zone 2 via inter-zone edges according to one of three combinations: 10 and 26, 26 and 24, or and 24. Determination of minimum-length HPs involves evaluating all interior vertex permutations for each of the three boundary vertex combinations. Table 2 shows the results.

TABLE 2

| Candidate HPs for Zone 1 | | | | |
|---|---|---|---|---|
| 26 | 4 | 35 | 45 | 10 |
| 26 | 4 | 35 | 45 | 24 |
| 10 | 4 | 35 | 45 | 24 |

Figure 2:
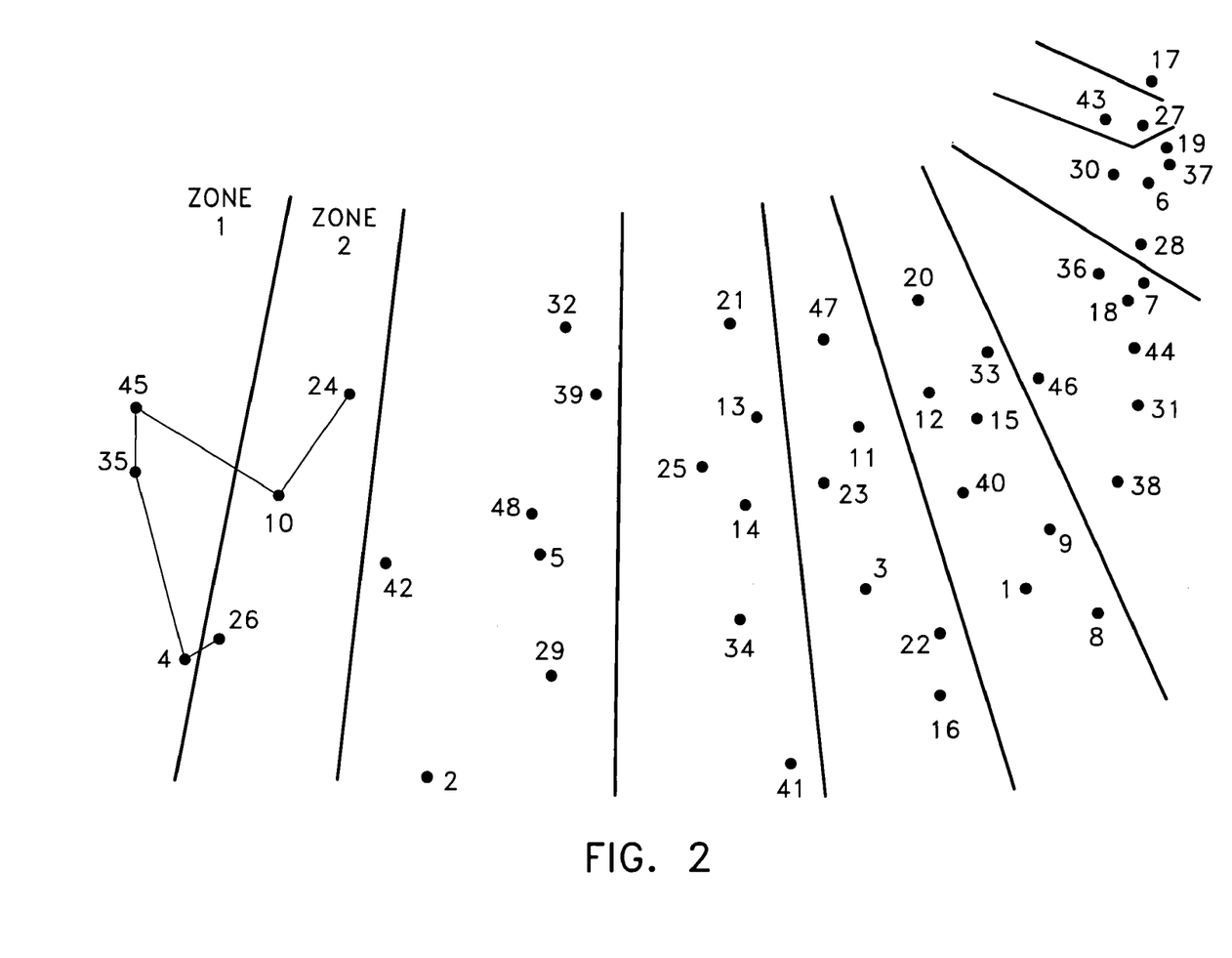
FIG. 2 depicts a Hamiltonian path between Zone 1 and Zone 2.

FIG. 2 depicts an optimal vertex permutation (i.e., the permutation having the shortest length) as 26-4-35-45-10. The crossing edges are 4-26 and 45-10.

Figure 3:
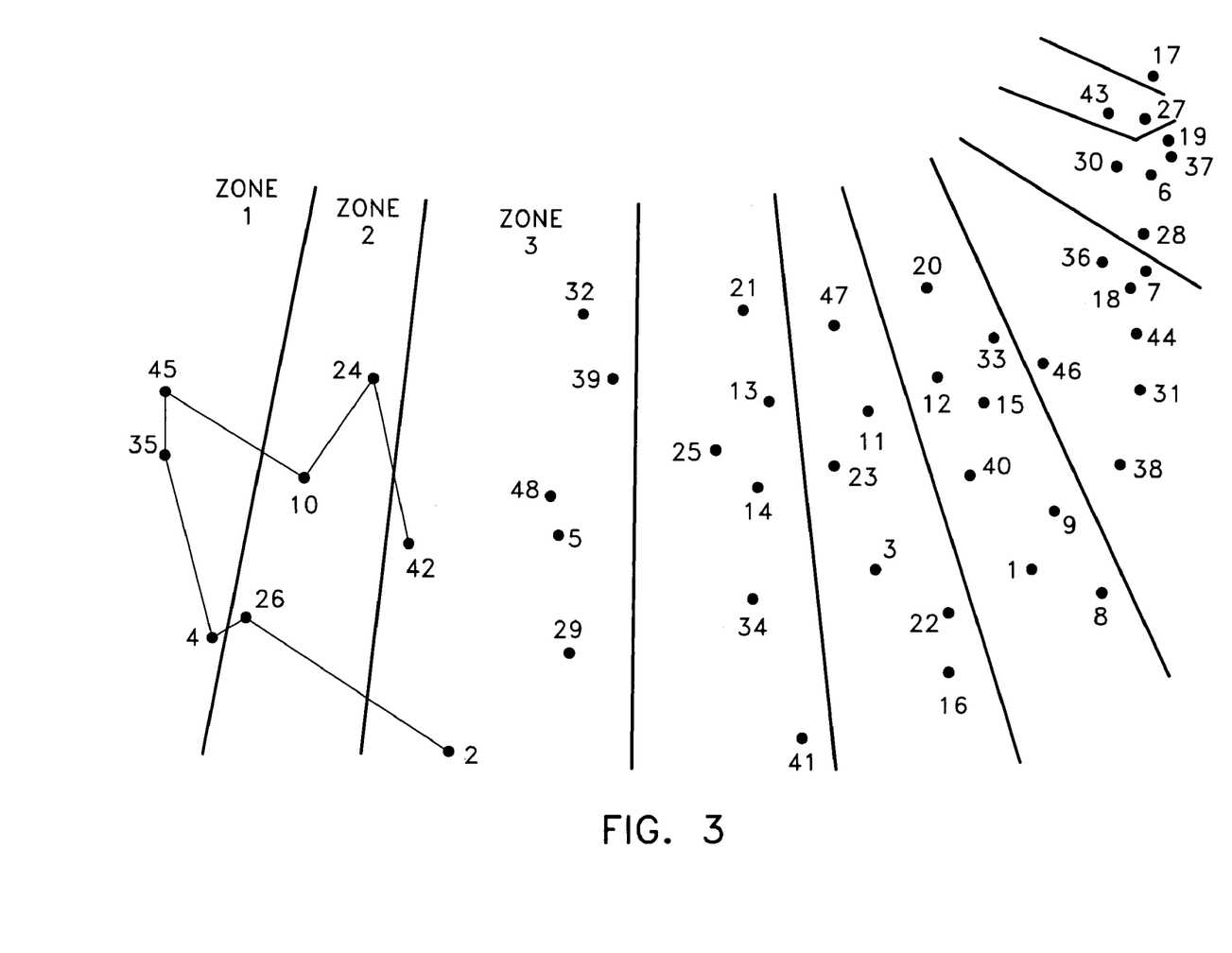
FIG. 3 depicts a Hamiltonian path extending from Zone 1 through Zone 2 and onto Zone 3.

As shown in FIG. 3, introduction of the second boundary (between Zone 2 and Zone 3) leads to the determination of HPs for the combined vertices in Zone 1 and Zone 2 (vertices 26, 10, and 24). Each HP could terminate to two (or more) of the boundary vertices 2, 29, 42, 48, 39, and 32 in Zone 3. Vertex 5 is not considered a boundary vertex because vertex 2 is directly in front of vertex 5; thereby, making it unlikely that vertex 5 would extend into zone 2.

When n=2, the six boundary vertices in Zone 3 have fifteen possible combinations. Although n=4 is possible, it would require two edges from vertex 10 to cross the boundary. Including extra crossing edges would lead to the evaluation of more boundary vertex combinations and would involve determining optimal HPs on the basis of the sum of their lengths (with embedded HPs from Zone 1). Minimizing n (when possible) reduces computation time.

Table 3 shows the possibilities searched in Zone 2 for the candidate HPs when n=2. Vertices $V_1$ and $V_2$ are two of the boundary vertices 2, 29, 42, 48, 39, and 32. Embedded HPs 10-24, 10-26, and 24-26 are shown in bold typeface, both in the text and the tables that follow.

TABLE 3

| Zone 2 Possibilities Searched Embedded HPs from Zone 2 | | | | | | | | | | | |
|---|---|---|---|---|---|---|---|---|---|---|---|
| $V_1$ | $V_1$ | $V_1$ | $V_1$ | $V_1$ | $V_1$ | $V_1$ | $V_1$ | $V_1$ | $V_1$ | $V_1$ | $V_1$ |
| 10 | 24 | 26 | 26 | 26 | 24 | 10 | 10 | 10 | 26 | 24 | 24 |
| 24 | 10 | 10 | 24 | 24 | 26 | 26 | 24 | 26 | 10 | 10 | 26 |
| 26 | 26 | 24 | 10 | 10 | 10 | 24 | 26 | 24 | 24 | 26 | 10 |
| $V_2$ | $V_2$ | $V_2$ | $V_2$ | $V_2$ | $V_2$ | $V_2$ | $V_2$ | $V_2$ | $V_2$ | $V_2$ | $V_2$ |

Each of the twelve possibilities in Table 3 are searched for the fifteen $V_1/V_2$ combinations to obtain fifteen minimum-length HPs for Zone 2 (Table 4), with embedded HPs in bold typeface. The Zone 2 solution contains only embedded HPs 26-10 and 26-24, eliminating HP 10-24 (See FIG. 2).

TABLE 4

| Candidate HPs for Zone 2 | | | | |
|---|---|---|---|---|
| 2 | 26 | 10 | 24 | 29 |
| 2 | 26 | 10 | 24 | 42 |
| 2 | 26 | 10 | 24 | 48 |
| 2 | 26 | 10 | 24 | 39 |
| 2 | 26 | 10 | 24 | 32 |
| 29 | 26 | 10 | 24 | 42 |
| 29 | 26 | 10 | 24 | 48 |
| 29 | 26 | 10 | 24 | 39 |
| 29 | 26 | 10 | 24 | 32 |
| 42 | 26 | 10 | 24 | 48 |
| 42 | 26 | 10 | 24 | 39 |
| 42 | 26 | 10 | 24 | 32 |
| 48 | 10 | 26 | 24 | 39 |
| 48 | 10 | 26 | 24 | 32 |
| 39 | 10 | 26 | 24 | 32 |

The Zone 3 solution (Table 5) has only two distinct embedded HPs: 2-42 and 32-42. HP 32-42 is not the minimum length HP, but HP 32-42 will not be eliminated until later. All other HPs were eliminated in the Zone 3 solution. Embedded HPs in Table 5 are indicated in bold. Table 4 shows that both HP 2-42 and HP 32-42 contain the embedded HP 26-10 from Zone 2.

TABLE 5

| Candidate HPs for Zone 3 | | | | | | | | |
|---|---|---|---|---|---|---|---|---|
| 41 | 29 | 2 | 42 | 32 | 39 | 48 | 5 | 34 |
| 41 | 29 | 2 | 42 | 5 | 48 | 32 | 39 | 14 |
| 41 | 29 | 2 | 42 | 5 | 48 | 32 | 39 | 25 |
| 41 | 29 | 2 | 42 | 5 | 48 | 39 | 32 | 13 |
| 41 | 29 | 2 | 42 | 5 | 48 | 39 | 32 | 21 |
| 34 | 29 | 2 | 42 | 5 | 48 | 32 | 39 | 14 |
| 34 | 29 | 2 | 42 | 5 | 48 | 32 | 39 | 25 |
| 34 | 29 | 2 | 42 | 5 | 48 | 39 | 32 | 13 |
| 34 | 29 | 2 | 42 | 5 | 48 | 39 | 32 | 21 |
| 14 | 48 | 5 | 29 | 2 | 42 | 32 | 39 | 25 |
| 14 | 48 | 5 | 29 | 2 | 42 | 32 | 39 | 13 |
| 14 | 48 | 5 | 29 | 2 | 42 | 32 | 39 | 21 |
| 25 | 48 | 5 | 29 | 2 | 42 | 32 | 39 | 13 |
| 25 | 48 | 5 | 29 | 2 | 42 | 32 | 39 | 21 |
| 13 | 39 | 48 | 5 | 29 | 2 | 42 | 32 | 21 |

Figure 4:
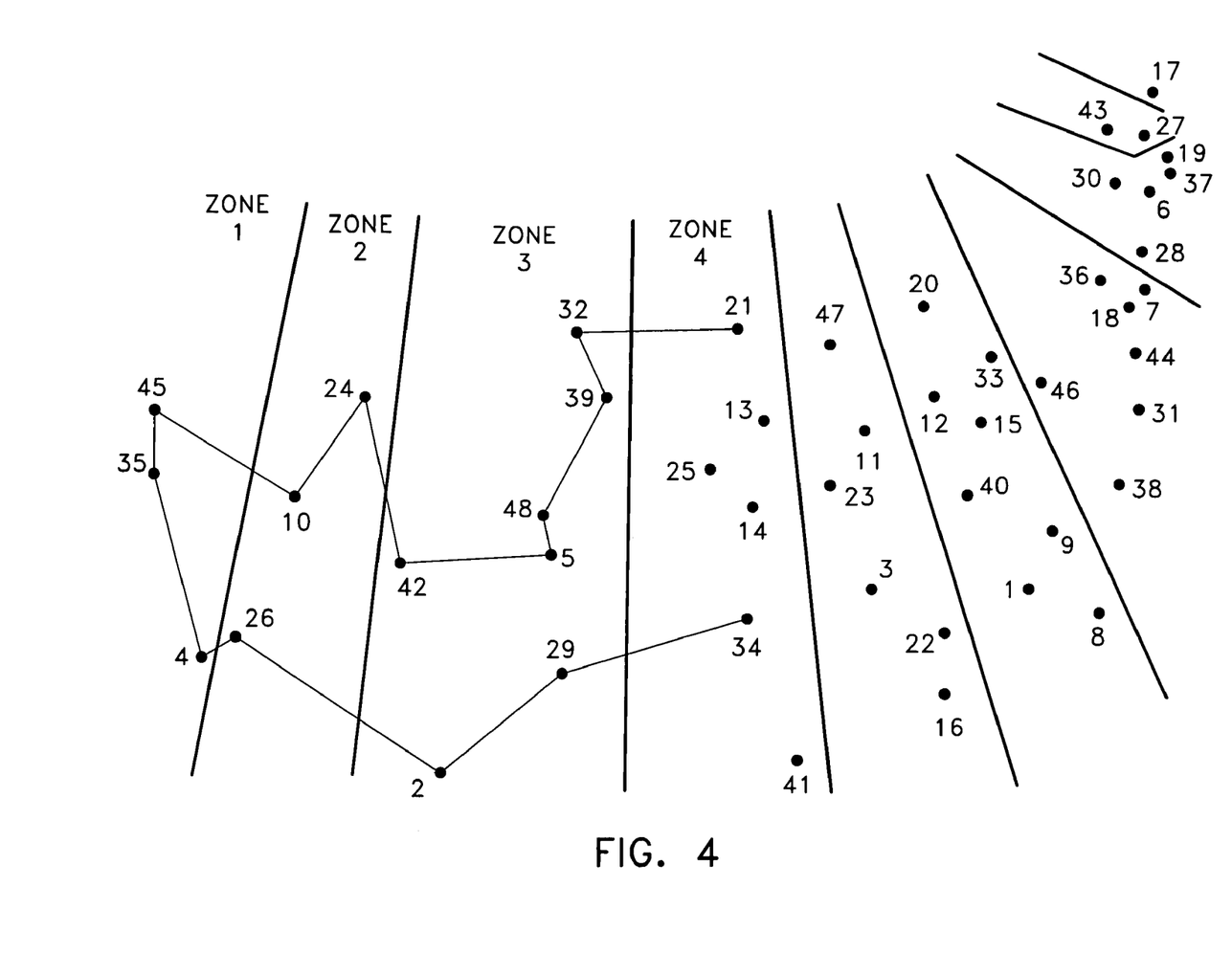
FIG. 4 depicts a Hamiltonian path extending from Zone 1 through Zone 2, 3 and onto Zone 4.

Zone 4 connects edges to four boundary vertices in Zone 5 (Table 6) generating two HPs for each boundary vertex combination. For each case, either 1st and 2nd and 3rd and 4th, or the 1st and 4th and 2nd and 3rd boundary vertices can define the two HPs, effectively doubling the number of combinations. The number of vertices in each HP can vary, but must sum to ten, and only the pair that minimizes the sum of their lengths is retained.

Zone 4 contains only six distinct embedded HPs: 34-21, 34-25, 25-21, 41-21, and 41-25. Edges 32-21 and 29-34 are both contained by embedded HP 34-21.

TABLE 6

Candidate HPs for Zone 4

| 1st HP | | | | 2nd HP | | | | | | |
|---|---|---|---|---|---|---|---|---|---|---|
| 16 | 41 | 22 | | 3 | 34 | 21 | 13 | 25 | 14 | 23 |
| 16 | 41 | 22 | | 3 | 34 | 21 | 13 | 25 | 14 | 11 |
| 16 | 41 | 22 | | 3 | 34 | 25 | 14 | 13 | 21 | 47 |
| 16 | 41 | 34 | 22 | 23 | 14 | 25 | 21 | 13 | 11 | |
| 16 | 41 | 22 | | 23 | 13 | 25 | 14 | 34 | 21 | 47 |
| 16 | 41 | 22 | | 11 | 13 | 25 | 14 | 34 | 21 | 47 |
| 16 | 41 | 34 | 3 | 23 | 14 | 25 | 21 | 13 | 11 | |
| 16 | 41 | 21 | 47 | 3 | 34 | 14 | 25 | 13 | 23 | |
| 16 | 41 | 34 | 3 | 11 | 13 | 14 | 25 | 21 | 47 | |
| 16 | 41 | 34 | 21 | 47 | 23 | 14 | 25 | 13 | 11 | |
| 22 | 41 | 34 | 3 | 23 | 14 | 25 | 21 | 13 | 11 | |
| 22 | 41 | 34 | 3 | 23 | 13 | 14 | 25 | 21 | 47 | |
| 22 | 41 | 34 | 3 | 11 | 13 | 14 | 25 | 21 | 47 | |
| 22 | 41 | 34 | 25 | 14 | 23 | 11 | 13 | 21 | 47 | |
| 3 | 34 | 41 | 25 | 14 | 23 | 11 | 13 | 21 | 47 | |

Figure 5:
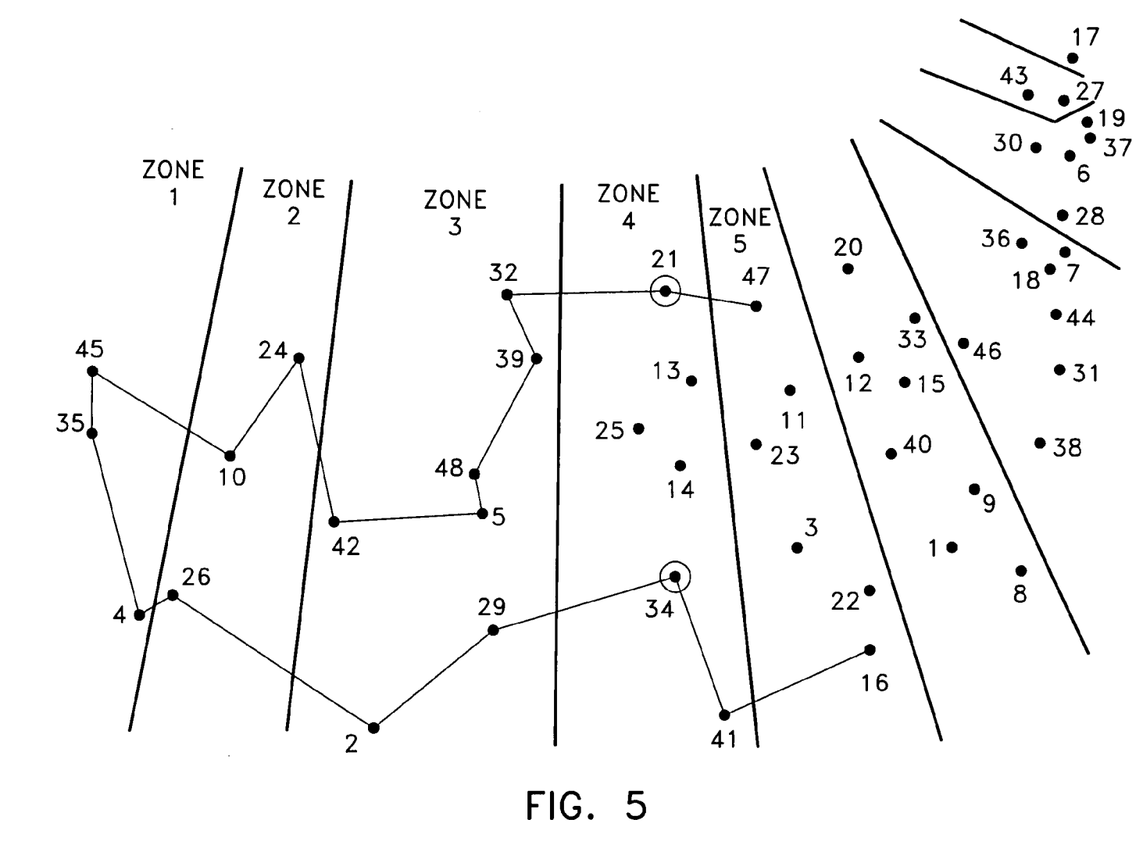
FIG. 5 depicts a Hamiltonian path extending from Zone 1 through Zone 2, 3, 4 and onto Zone 5.

Zone 5 (Table 7) has only four distinct sets of embedded HPs from Zone 4: 16-23 and 47-11; 16-47 and 3-23; 16-47 and 23-11; 16-23 and 11-47.

Table 6 shows that the four distinct HPs in Zone 4 (that are embedded in Zone 5) contain only two distinct HPs from Zone 3: 34-21 and 41-21. Both have the embedded HP 2-42. In FIG. 5, HP 2-42 is contained in HP 34-21 (shown). HP 41-21 is not shown, but differs only in that edge 41-29 replaces edge 34-29, so both contain HP 2-42. In other words, the approach continues to automatically filter out extraneous HPs that locally had a minimum length in a previous combination of zones (for a particular boundary vertex combination), but are not consistent with the global minimum-length HC.

In Table 7, the first HP connects two edges to Zone 6. The second HP demonstrates the "closing the loop" process necessary when the number of crossing edges n decreases from one boundary to the next. In this case, n decreases from four (across the fourth boundary) to two (across the fifth boundary), and both ends of the $2^{nd}$ HP terminate at boundary vertices in Zone 4. The loop closes when the HP crosses back into FIG. 6 to capture vertex 13, 25 and 14. As already noted, the terminating loop can contain ends from two separate HPs from Zone 4. For example, the HPs 16-47 and 11-23 from Zone 5 lead to HPs 20-12 in Zone 6; HP 16-23 terminates in Zone 5 when n=2 in Zone 6. In other words, HP 11-23 and vertices 3, 22, and 16 coalesce into HP 16-11, which terminates in Zone 5.

Figure 6:
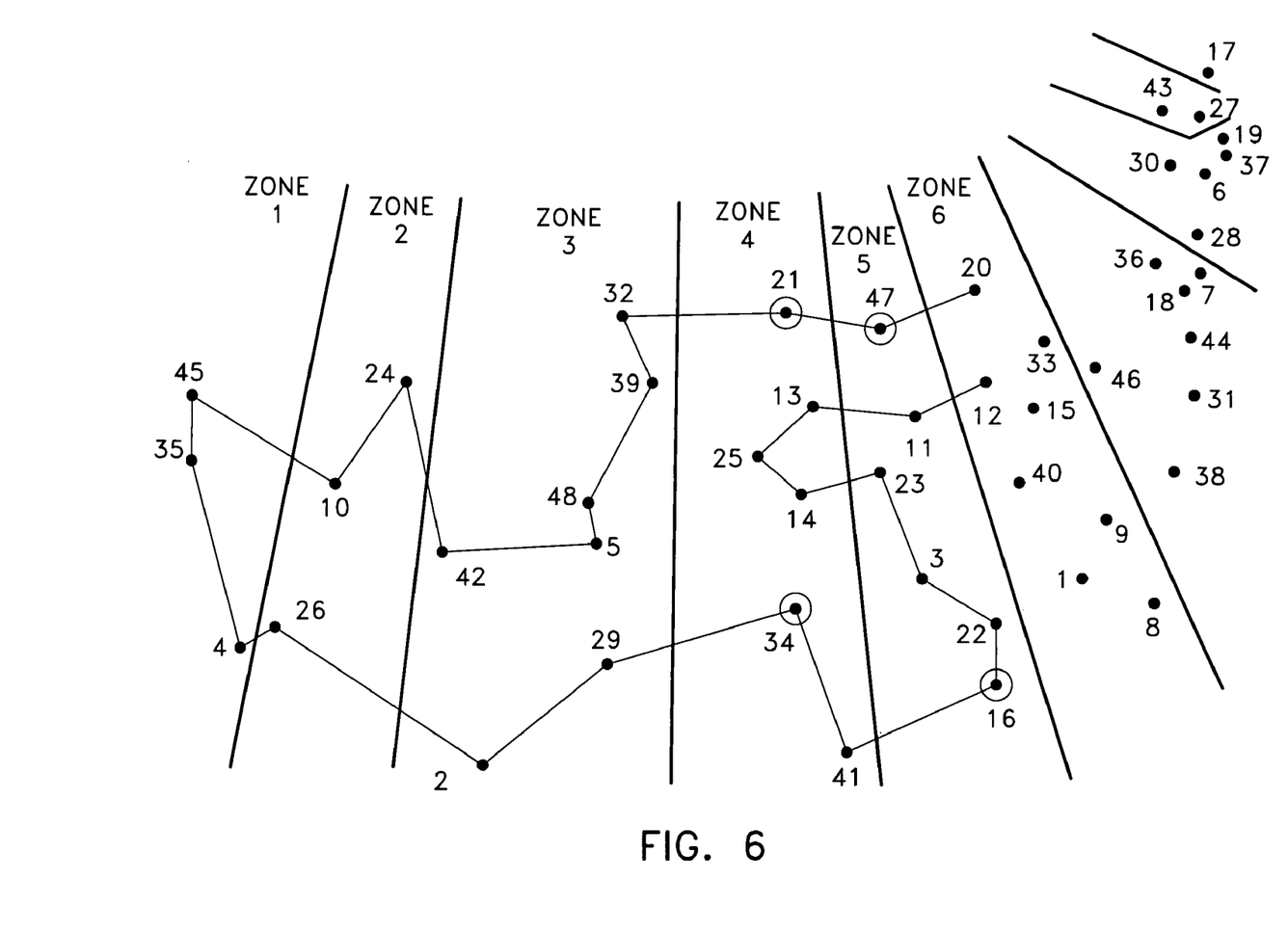
FIG. 6 depicts a Hamiltonian path extending from Zone 1 through Zone 2, 3, 4 onto Zone 5 back to Zone 4 through Zone 5 and onto Zone 6—routing back to vertices 13, 25 and 14 being necessary because of the increase to four crossing edges between zones 4 and 5.

Zones 6 to 8 have only two edges connecting to either adjacent zone. The only remaining embedded HPs in Zone 6 (Table 8) are 12-20 and 1-20, reducing the embedded HPs from Zone 5 to 11-47 and 16-23, 16-47 and 23-11.

TABLE 7

Candidate HPs for Zone 5

| 1st HP | | | | 2nd HP | | | |
|---|---|---|---|---|---|---|---|
| 8 | 16 | 23 | 3 | 22 | 1 | 47 | 11 |
| 8 | 22 | 16 | 23 | 3 | 9 | 47 | 11 |
| 8 | 22 | 16 | 23 | 3 | 40 | 47 | 11 |
| 8 | 22 | 16 | 47 | 11 | 15 | 3 | 23 |
| 8 | 22 | 16 | 47 | 11 | 12 | 3 | 23 |
| 8 | 22 | 3 | 16 | 47 | 20 | 23 | 11 |
| 1 | 22 | 16 | 23 | 3 | 9 | 47 | 11 |
| 1 | 22 | 16 | 23 | 3 | 40 | 47 | 11 |
| 1 | 22 | 16 | 47 | 11 | 15 | 3 | 23 |
| 1 | 22 | 16 | 47 | 11 | 12 | 3 | 23 |
| 1 | 3 | 22 | 16 | 47 | 20 | 23 | 11 |

TABLE 7-continued

Candidate HPs for Zone 5

| 1st HP | | | | 2nd HP | | | | |
|---|---|---|---|---|---|---|---|---|
| 9 | 22 | 16 | 23 | 3 | 40 | 47 | 11 | |
| 9 | 3 | 22 | 16 | 47 | 15 | 23 | 11 | |
| 9 | 3 | 22 | 16 | 47 | 12 | 23 | 11 | |
| 9 | 3 | 22 | 16 | 47 | 20 | 23 | 11 | |
| 40 | 3 | 22 | 16 | 47 | 15 | 23 | 11 | |
| 40 | 3 | 22 | 16 | 47 | 12 | 23 | 11 | |
| 40 | 3 | 22 | 16 | 47 | 20 | 23 | 11 | |
| 15 | 11 | 47 | 12 | | | 16 | 22 | 3 | 23 |
| 15 | 11 | 47 | 20 | | | 16 | 22 | 3 | 23 |
| 12 | 11 | 47 | 20 | | | 16 | 22 | 3 | 23 |

TABLE 8

Candidate HPs for Zone 6

| 38 | 8 | 1 | 9 | 40 | 15 | 12 | 20 | 33 | 31 |
| 38 | 8 | 1 | 9 | 40 | 15 | 12 | 20 | 33 | 46 |
| 38 | 8 | 1 | 9 | 40 | 15 | 12 | 20 | 33 | 36 |
| 31 | 9 | 8 | 1 | 40 | 15 | 12 | 20 | 33 | 46 |
| 31 | 9 | 8 | 1 | 40 | 15 | 12 | 20 | 33 | 36 |
| 46 | 33 | 12 | 15 | 40 | 9 | 8 | 1 | 20 | 36 |

Figure 7:
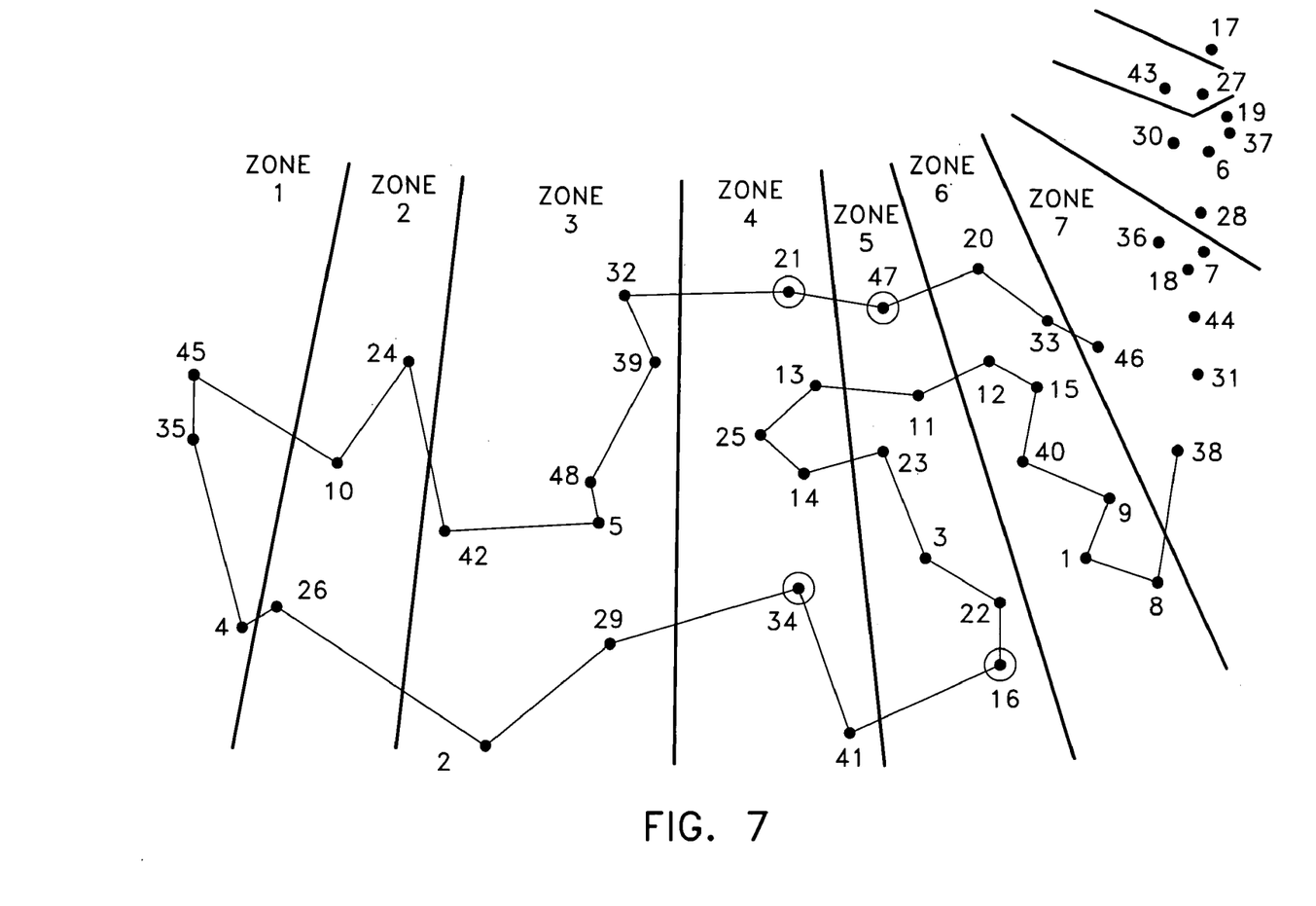
FIG. 7 depicts a Hamiltonian path extending from Zone 1 through Zone 2, 3, 4 onto Zone 5 back to Zone 4 through Zone 5, 6 and onto Zone 7.

Table 9 indicates that Zone 7 has only one embedded HP (38-46), which has the effect of eliminating all extraneous (non-optimal) embedded HPs from all previous zones.

Figure 8:
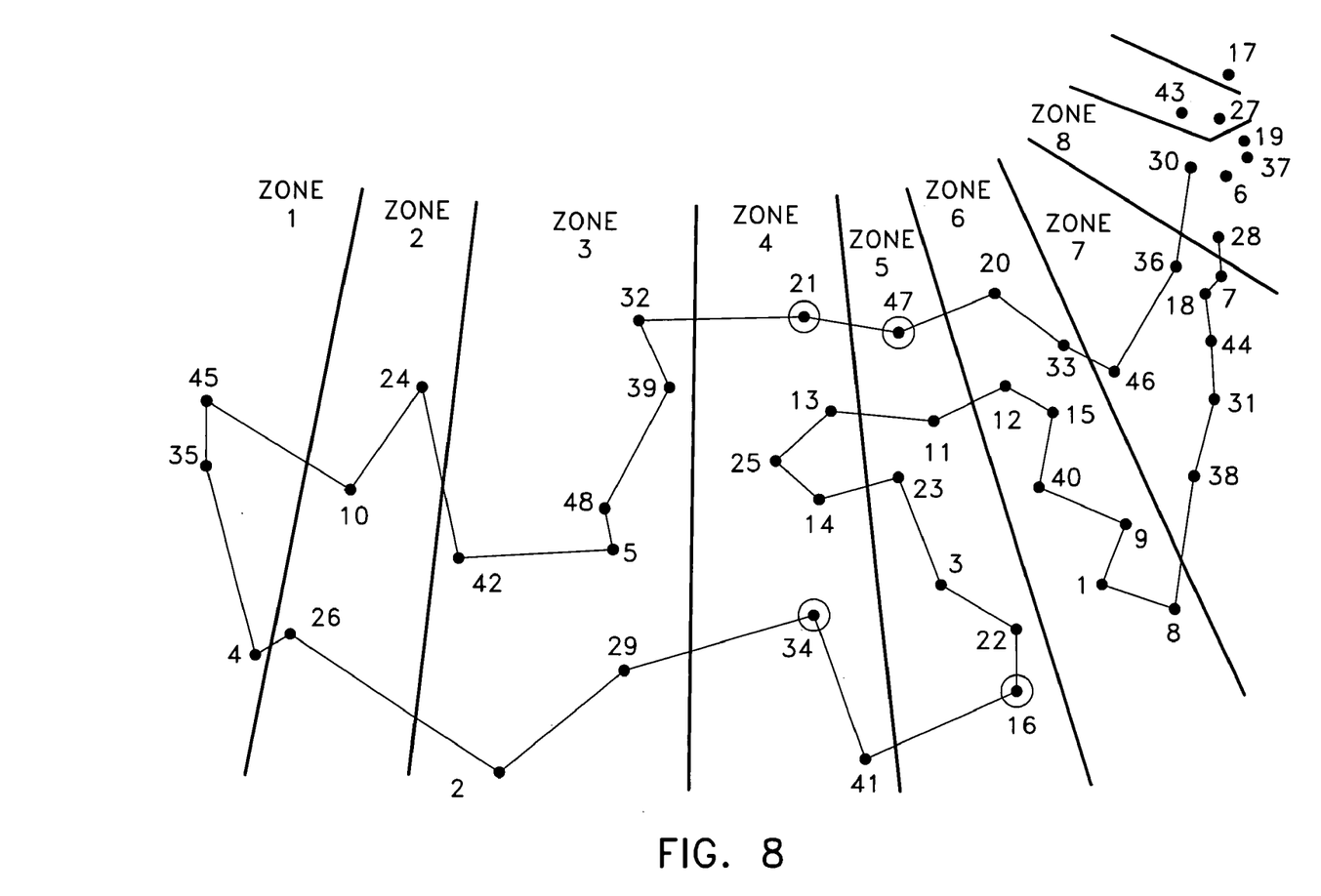
FIG. 8 depicts a Hamiltonian path extending from Zone 1 through Zone 2, 3, 4 onto Zone 5 back to Zone 4 through Zone 5, 6, 7 and onto Zone 8.
Figure 9:
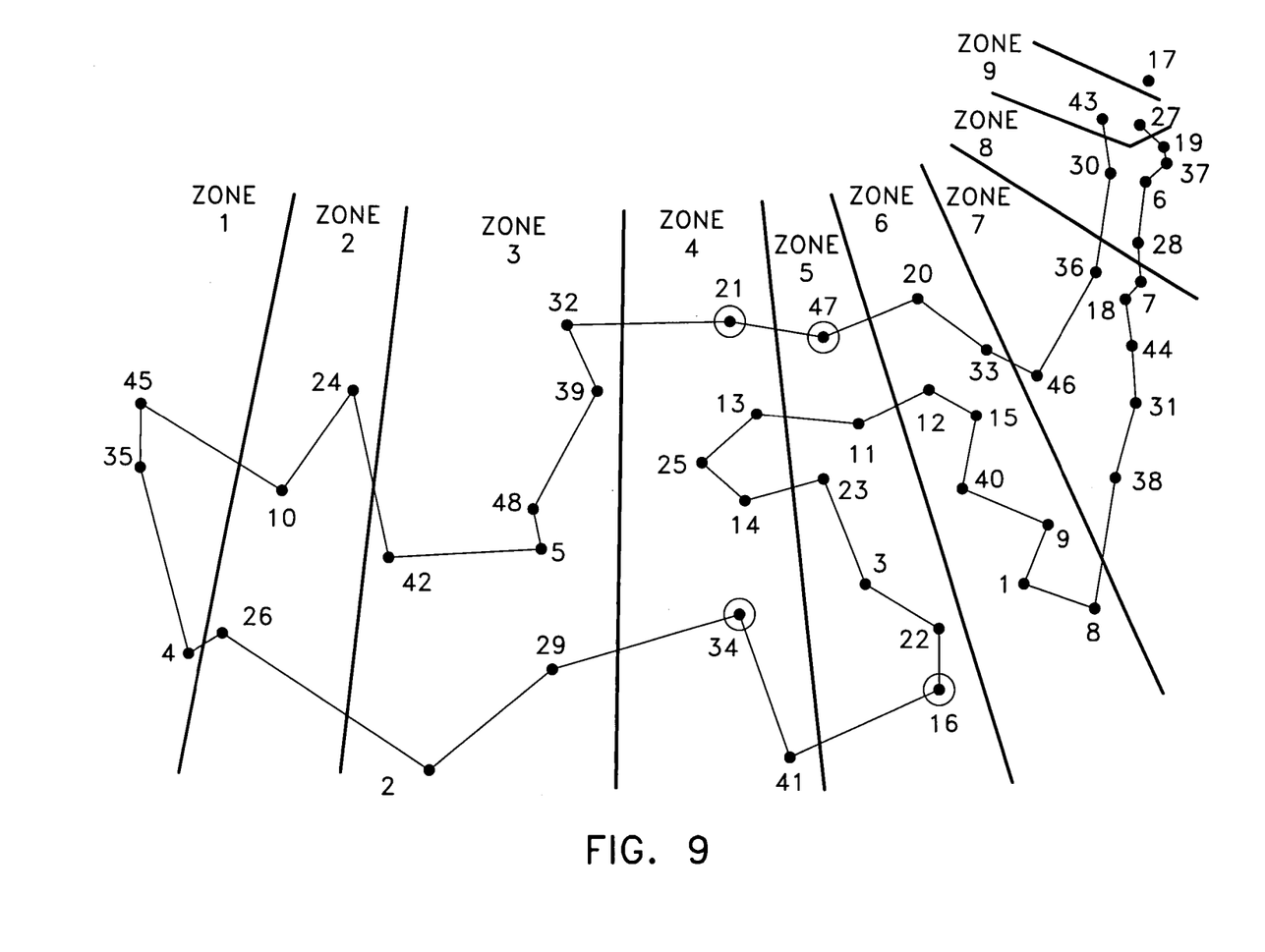
FIG. 9 depicts a Hamiltonian path extending from Zone 1 through Zone 2, 3, 4 onto Zone 5 back to Zone 4 through Zone 5, 6, 7,8 and onto Zone 9.

Finally, both Zones 8 and 9 have only two edges crossing their right boundaries (n=b'=2), reducing the number of minimum-length HPs in both cases to one: 27-19-37-6-28-30-43 (Zone 8) and 17-27-43-17 (Zone 9).

Figure 10:
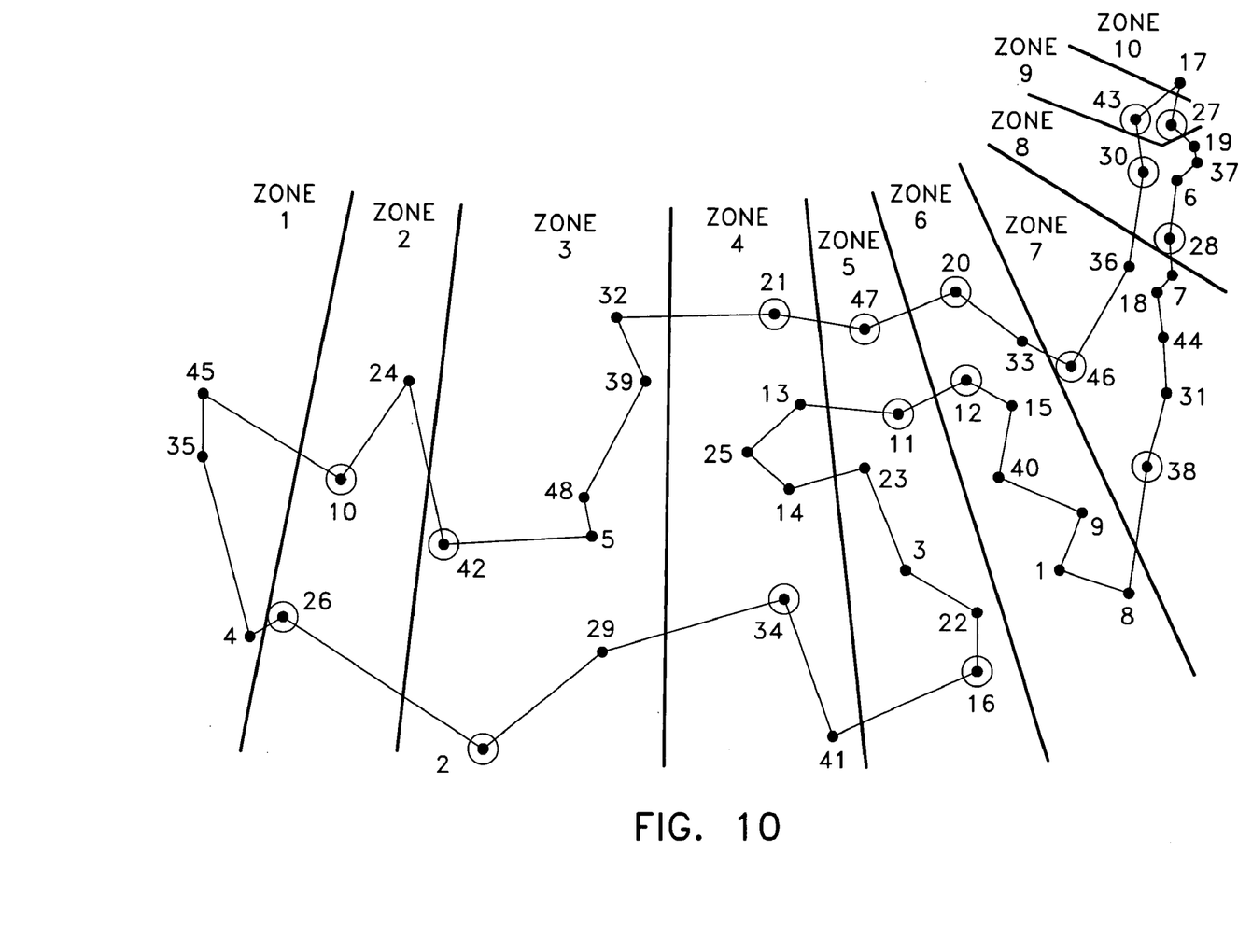
FIG. 10 depicts a Hamiltonian path extending from Zone 1 through Zone 2, 3, 4 onto Zone 5 back to Zone 4 through Zone 5, 6, 7, 8, 9 and onto Zone 10.

The optimal HC (Table 10) results from working backwards to extract the embedded HP (28-30) from the Zone 8 solution, and then extracting the embedded HP (38-46), from the Zone 7 solution, etc. Substituting all of the vertices into embedded HPs leads to the overall solution. In FIG. 10, the vertices of the embedded HPs are circled.

TABLE 9

Candidate HPs for Zone 7

| 28 | 7 | 18 | 44 | 31 | 38 | 46 | 36 | 6 |
| 28 | 7 | 18 | 44 | 31 | 38 | 46 | 36 | 30 |
| 28 | 7 | 18 | 44 | 31 | 38 | 46 | 36 | 37 |
| 28 | 7 | 18 | 44 | 31 | 38 | 46 | 36 | 19 |
| 6 | 7 | 18 | 44 | 31 | 38 | 46 | 36 | 30 |
| 6 | 36 | 46 | 38 | 31 | 44 | 18 | 7 | 37 |
| 6 | 36 | 46 | 38 | 31 | 44 | 18 | 7 | 19 |
| 30 | 36 | 46 | 38 | 31 | 44 | 18 | 7 | 37 |
| 30 | 36 | 46 | 38 | 31 | 44 | 18 | 7 | 19 |
| 37 | 7 | 18 | 44 | 31 | 38 | 46 | 36 | 19 |

TABLE 10

ATT48 solution

| Zone | Optimal HPS (embedded HPs in bold) | | | | | | | | |
|---|---|---|---|---|---|---|---|---|---|
| 1 | 26 | 4 | 35 | 45 | 10 | | | | |
| 2 | 2 | 26 | 10 | 24 | 42 | | | | |
| 3 | 34 | 29 | 2 | 42 | 5 | 48 | 39 | 32 | 21 |
| 4 | 16 | 41 | 34 | 21 | 47 | | 23 | 14 | 25 | 13 | 11 |
| 5 | 12 | 11 | 47 | 20 | | 16 | 22 | 3 | 23 | |
| 6 | 38 | 8 | 1 | 9 | 40 | 15 | 12 | 20 | 33 | 46 |
| 7 | 28 | 7 | 18 | 44 | 31 | 38 | 46 | 36 | 30 | |
| 8 | 27 | 19 | 37 | 6 | 28 | 30 | 43 | | | |
| 9 | 17 | 27 | 43 | 17 | | | | | | |

Introducing lengthwise boundaries allows optimal HPs to be determined locally for each zone (one for each boundary vertex combination). The lengthwise boundaries also allow the solution to progress successively from zone to zone, automatically filtering out previous HPs that are inconsistent with a globally minimum-length HC. Embedded HPs from previous zones helps to reduce the computation time.

The solution efficiency depends on the number of boundary vertices and crossing edges for each zone. The referenced ATT48 problem requires only two interzone edges from each zone, except Zone 4, which has four inter-zone edges (to Zone 5). Although the approach considered only limited values of n and b rather than all possible values, the approach can also increase n and b for more complex problems.

Including results for n≠2 (or n≠4 for Zone 4) will add non-optimal solutions to ATT48, increasing the computation time linearly with the added number of combinations.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A computer-implemented method for solving a combinatorial optimization problem of transit point routing, said method comprising the steps of:
   marking a plurality of vertices representing transit points;
   intersecting the plurality of vertices with a plurality of boundaries with each of the boundaries offset from each other to create a plurality of open-ended zones bordered by the boundaries;
   enumerating a first set of vertices within a first zone of the open-ended zones;
   enumerating a second set of vertices within a second zone located across a first boundary of the plurality of boundaries from the first zone of the open-ended zones;
   plotting a first set of minimum length Hamiltonian paths for the first set of vertices;
   plotting a second set of minimum length Hamiltonian paths for the second zone by considering only vertices in the second zone and the minimum length Hamiltonian path of the first zone;
   connecting the first set of Hamiltonian paths with the second set of Hamiltonian paths; and
   defining a first transit point route by said connecting step to include the vertices of the first and second zones.

2. The method in accordance with claim 1, said method further comprising the steps of:
   enumerating a third set of vertices within a third zone located across a second boundary of the plurality of boundaries from the second zone of the open-ended zones;
   plotting a third set of minimum length Hamiltonian paths for the third zone by considering only vertices in the third zone and the minimum length Hamiltonian path of the second zone;
   connecting the third set of Hamiltonian paths with the second set of Hamiltonian paths; and
   defining a second transit point route by said third set connecting step to include the vertices of the first, second and third zones.

3. The method in accordance with claim 2, said method further comprising the steps of:
   enumerating a fourth set of vertices within a fourth zone located across a third boundary of the plurality of boundaries from the third zone of the open-ended zones;
   plotting a fourth set of minimum length Hamiltonian paths for the fourth zone by considering only vertices in the fourth zone and the minimum length Hamiltonian path of the third zone;
   connecting the fourth set of Hamiltonian paths with the third set of Hamiltonian paths; and
   defining a third transit point route by said fourth set connecting step to include the vertices of the first, second, third and fourth zones.

4. The method in accordance with claim 3, said method further comprising the steps of:
   enumerating a fifth set of vertices within a fifth zone located across a fourth boundary of the plurality of boundaries from the fourth zone of the open-ended zones;
   plotting a fifth set of minimum length Hamiltonian paths for the fifth zone by considering only vertices in the fifth zone and the minimum length Hamiltonian path of the fourth zone;
   connecting the fifth set of Hamiltonian paths with the fourth set of Hamiltonian paths; and
   defining a fourth transit point route by said fifth set connecting step to include the vertices of the first, second, third, fourth and fifth zones.

5. The method in accordance with claim 4, said method further comprising the steps of:
   enumerating a sixth set of vertices within a sixth zone located across a fifth boundary of the plurality of boundaries from the fifth zone of the open-ended zones;
   plotting a sixth set of minimum length Hamiltonian paths for the sixth zone by considering only vertices in the sixth zone and the minimum length Hamiltonian path of the fifth zone;
   connecting the sixth set of Hamiltonian paths with the fifth set of Hamiltonian paths; and
   defining a fifth transit point route by said sixth set connecting step to include the vertices of the first, second, third, fourth, fifth and sixth zones.

6. The method in accordance with claim 5, said method further comprising the steps of:
   enumerating a seventh set of vertices within a seventh zone located across a sixth boundary of the plurality of boundaries from the sixth zone of the open-ended zones;
   plotting a seventh set of minimum length Hamiltonian paths for the seventh zone by considering only vertices in the seventh zone and the minimum length Hamiltonian path of the sixth zone;
   connecting the seventh set of Hamiltonian paths with the sixth set of Hamiltonian paths; and
   defining a sixth transit point route by said seventh set connecting step to include the vertices of the first, second, third, fourth, fifth, sixth and seventh zones.

7. The method in accordance with claim 6, said method further comprising the steps of:
   enumerating an eighth set of vertices within an eighth zone located across a seventh boundary of the plurality of boundaries from the seventh zone of the open-ended zones;
   plotting an eighth set of minimum length Hamiltonian paths for the eighth zone by considering only vertices in the eighth zone and the minimum length Hamiltonian path of the seventh zone;

connecting the eighth set of Hamiltonian paths with the seventh set of Hamiltonian paths; and defining a seventh transit point route by said eighth set connecting step to include the vertices of the first, second, third, fourth, fifth, sixth, seventh and eighth zones.

8. The method in accordance with claim 7, said method further comprising the steps of:

enumerating a ninth set of vertices within a ninth zone located across an eighth boundary of the plurality of boundaries from the eighth zone of the open-ended zones;

plotting a ninth set of minimum length Hamiltonian paths for the ninth zone by considering only vertices in the ninth zone and the minimum length Hamiltonian path of the eighth zone;

connecting the ninth set of Hamiltonian paths with the eighth set of Hamiltonian paths; and defining an eighth transit point route by said ninth set connecting step to include the vertices of the first, second, third, fourth, fifth, sixth, seventh, eighth and ninth zones.

9. The method in accordance with claim 8, said method further comprising the steps of:

enumerating a tenth set of vertices within a tenth zone located across a ninth boundary of the plurality of boundaries from the ninth zone of the open-ended zones;

plotting a tenth set of minimum length Hamiltonian paths for the tenth zone by considering only vertices in the tenth zone and the minimum length Hamiltonian path of the ninth zone;

connecting the tenth set of Hamiltonian paths with the ninth set of Hamiltonian paths; and defining a ninth transit point route by said tenth set connecting step to include the vertices of the first, second, third, fourth, fifth, sixth, seventh, eighth and ninth zones.

10. The method in accordance with claim 9, said method further comprising a set of boundary vertices that is less than all possible vertices in a zone.

11. The method in accordance with claim 10, said method further comprising a set of boundary vertices comprising only the vertices closest to the boundary.

12. The method in accordance with claim 9, wherein the number of crossing edges decreases from a first boundary to a second boundary, wherein both ends of the Hamiltonian path terminate in the zone between the first boundary and the second boundary.

13. The method in accordance with claim 12, wherein the terminating loop contains ends from two separate Hamiltonian paths.

14. The method in accordance with claim 9, wherein optimal Hamiltonian paths are determined locally for each zone, one for each boundary vertex combination.

* * * * *